(12) United States Patent
Hasegawa (10) Patent No.: US 8,126,314 B2
(45) Date of Patent: Feb. 28, 2012

(54) TIMER RESERVATION DEVICE AND INFORMATION RECORDING APPARATUS

(75) Inventor: Hiroshi Hasegawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1407 days.

(21) Appl. No.: 11/708,908

(22) Filed: Feb. 22, 2007

(65) Prior Publication Data

US 2007/0212021 A1    Sep. 13, 2007

(30) Foreign Application Priority Data

Mar. 2, 2006  (JP) .................................. 2006-055974

(51) Int. Cl.
*H04N 5/76* (2006.01)
(52) U.S. Cl. ....................................................... 386/291
(58) Field of Classification Search ........................ None
See application file for complete search history.

(56) References Cited

U.S. PATENT DOCUMENTS

| 4,905,212 A | * | 2/1990 | Wakahara | ........................ 368/10 |
| 6,674,958 B2 | * | 1/2004 | Wehmeyer et al. | ............ 386/291 |
| 7,103,262 B2 | * | 9/2006 | Nakatani et al. | .............. 386/241 |
| 7,137,136 B1 | * | 11/2006 | Aratani | ............................ 725/53 |

FOREIGN PATENT DOCUMENTS

JP    A-2001-221876    8/2001

* cited by examiner

*Primary Examiner* — William C Vaughn, Jr.
*Assistant Examiner* — Eileen Adams
(74) *Attorney, Agent, or Firm* — Morgan, Lewis & Bockius LLP (57) ABSTRACT

A timer reservation device can enter a number greater than 24 as hours of time when the timer reservation is performed, and as to the recording reservation in a DVD recorder, "Dec. 16 (Thursday)", for example, is entered as record start date, "25:00" is entered as record start time, and "27:00" is entered as record end time, so that the recording reservation from one o'clock to three o'clock after midnight on Dec. 17 (Friday) can be performed.

6 Claims, 6 Drawing Sheets

| DATE | START | END | CH | IMAGE QUALITY |
|------|-------|-----|-----|---------------|
| -- | -- | -- | -- | -- |

| DATE | START | END | CH | IMAGE QUALITY |
|---|---|---|---|---|
| DEC. 17 (FRIDAY) | 01:00 | 03:00 | 2 | SP |

| DATE | START | END | CH | IMAGE QUALITY |
|---|---|---|---|---|
| DEC. 16 (THURSDAY) | 01:00 | 03:00 | 2 | SP |

| DATE | START | END | CH | IMAGE QUALITY |
|---|---|---|---|---|
| DEC. 16 (THURSDAY) | 25:00 | 27:00 | 2 | SP |

| DATE | START | END | CH | IMAGE QUALITY |
|---|---|---|---|---|
| DEC. 16 (THURSDAY) | 13:00P.M. | 15:00P.M. | 2 | SP |

30

TIMER RESERVATION DEVICE AND INFORMATION RECORDING APPARATUS

This application is based on Japanese Patent Application No. 2006-055974 filed on Mar. 2, 2006, the contents of which are hereby incorporated by reference.

BACKGROUND OF THE INVENTION

1. Field of the Invention

The present invention relates to a timer reservation device and an information recording apparatus.

2. Description of Related Art

There are a lot of widespread electric household appliances having a timer reservation function such as a recording reservation function of a video cassette recorder, in which various operation is performed based on an input of date and time designated by a user so that the operation starts when the designated date and time comes.

As to such electric household appliances having the timer reservation function, there is often a situation where a desired timer function is not realized when a user mistakes in setting date for the timer reservation, i.e., setting date to that day wrongly instead of the next day for making reservation of a certain operation to start at a time after midnight (e.g., at 2:00 a.m.).

JP-A-2001-221876 describes an invention for a purpose of dealing with the situation described above, which is related to a timer reservation device that includes a date and time comparing portion for comparing date and time of reservation set by a reservation setting portion with the present date and time, and a reservation set changing portion for changing the set date of reservation to the next day if it is decided that the set date of reservation is the same as the present date and the set time of reservation is earlier than the present time.

According to the invention described in JP-A-2001-221876, it is possible to provide a timer reservation device that can realize a desired timer function even if a user sets a timer reservation of a certain operation to start in early morning that day by mistake instead of after midnight the next day.

The timer reservation device described in JP-A-2001-221876 can prevent a mistake of setting by a user only in such a case where the user sets a timer reservation of a certain operation to start that day by mistake instead of the next day. However, as represented by a recording reservation function of a video cassette recorder, a timer reservation function of various electric household appliances is required to support reservation for days later from the present time.

In addition, it is common that programs after midnight are listed in a TV program table of the day before in TV program tables of newspapers, TV information magazines, the Internet and the like. Therefore, there is very high probability that a user enters date of two days later by mistake instead of three days later for setting recording reservation of a program after midnight. The timer reservation device described in JP-A-2001-221876 cannot deal with such a mistake, so it is not sufficient for a timer reservation device that can prevent mistakes by a use.

SUMMARY OF THE INVENTION

In view of the above described problem, it is an object of the present invention to provide a timer reservation device that can prevent a mistake in entering date for timer reservation for not only one day later but also two or more days later. And it is another object of the present invention to provide an information recording apparatus that can perform recording reservation by using the timer reservation device.

To attain the above described first object, a timer reservation device in accordance with one aspect of the present invention include: a reservation time input portion for entering reservation time; and a timer reservation setting portion for setting timer reservation to the reservation time that is entered by the reservation time input portion. And the timer reservation device is characterized by a structure in which an upper limit x of a number that can be entered as hours of the reservation time is an integer greater than 24.

According to this structure, when reservation time is entered by the reservation time input portion, the timer reservation setting portion sets timer reservation to the reservation time. In this case, an upper limit x of a number that can be entered as hours of the reservation time is an integer greater than 24. Therefore, even if the timer reservation is set to "two o'clock after midnight three days later" for example, it is possible to set the timer reservation to "26 hours two days later."

For example, it is common that programs after midnight are listed at the bottom in a TV program table of the day before in many TV program tables. Therefore, there is very high probability that a user mistakes in setting of timer reservation when entering date and time manually based on a TV program table, referring to a TV program table of the day before (setting by mistake to "two o'clock after midnight two days later" in the case of the above-mentioned example).

However, according to the above-mentioned structure of the present invention, an integer greater than 24 can be entered as hours of the reservation time. Therefore, even if the day before is entered as date, the timer reservation can be set to a time after midnight the next day by setting time using an integer greater than 24. Thus, it is possible to provide a timer reservation device that can prevent a mistake in entering date for timer reservation for not only one day later but also two or more days later.

Also to attain the above described first object, a timer reservation device in accordance with another aspect of the present invention include: a reservation time input portion for entering reservation time that includes information of a.m. or p.m.; and a timer reservation setting portion for setting timer reservation to the reservation time that is entered by the reservation time input portion. And the timer reservation device is characterized by a structure in which an upper limit x of a number that can be entered as hours of the reservation time is an integer greater than 12.

According to this structure, when reservation time that includes information of a.m. or p.m. is entered by the reservation time input portion, the timer reservation setting portion sets timer reservation to the reservation time. In this case, an upper limit x of a number that can be entered as hours of the reservation time is an integer greater than 12. Therefore, even if the timer reservation is set to "two o'clock after midnight three days later" for example, it is possible to set the timer reservation to "14 hours two days later." In other words, even if the day before is entered as date, the timer reservation can be set to a time after midnight the next day by setting time using an integer greater than 12. Thus, it is possible to provide a timer reservation device that can prevent a mistake in entering date for timer reservation for not only one day later but also two or more days later.

In the present invention, the timer reservation device having the structure described above may further include an upper limit input portion for entering the upper limit x.

According to this structure, concerning the timer reservation device in which an upper limit x of a number that can be entered as hours of the reservation time is an integer greater than 24 or the timer reservation device in which an upper limit x of a number that can be entered as hours of the reservation time including information of a.m. or p.m. is an integer greater than 12, a user can set the upper limit x. Therefore, it is possible to provide a timer reservation device that can prevent a mistake in entering data and has large flexibility for a user.

To attain the above described second object, an information recording apparatus in accordance with other aspect of the present invention include: the timer reservation device according to claim 1; and a timer recording portion for recording information on a recording medium at the time reserved by the timer reservation device.

According to this structure, it is possible to provide an information recording apparatus that can perform recording reservation by using the timer reservation device having the structure described above. Therefore, it is possible to provide an information recording apparatus that can prevent a mistake in entering date for recording reservation for not only one day later but also two or more days later.

According to the present invention, it is possible to provide a timer reservation device that can prevent a mistake in entering date for timer reservation for not only one day later but also two or more days later. In addition, according to the present invention, it is possible to provide an information recording apparatus that can perform recording reservation using the timer reservation device.

DETAILED DESCRIPTION OF THE PREFERRED EMBODIMENTS

Now, an embodiment of the present invention will be described with reference to the attached drawings.

Figure 1:
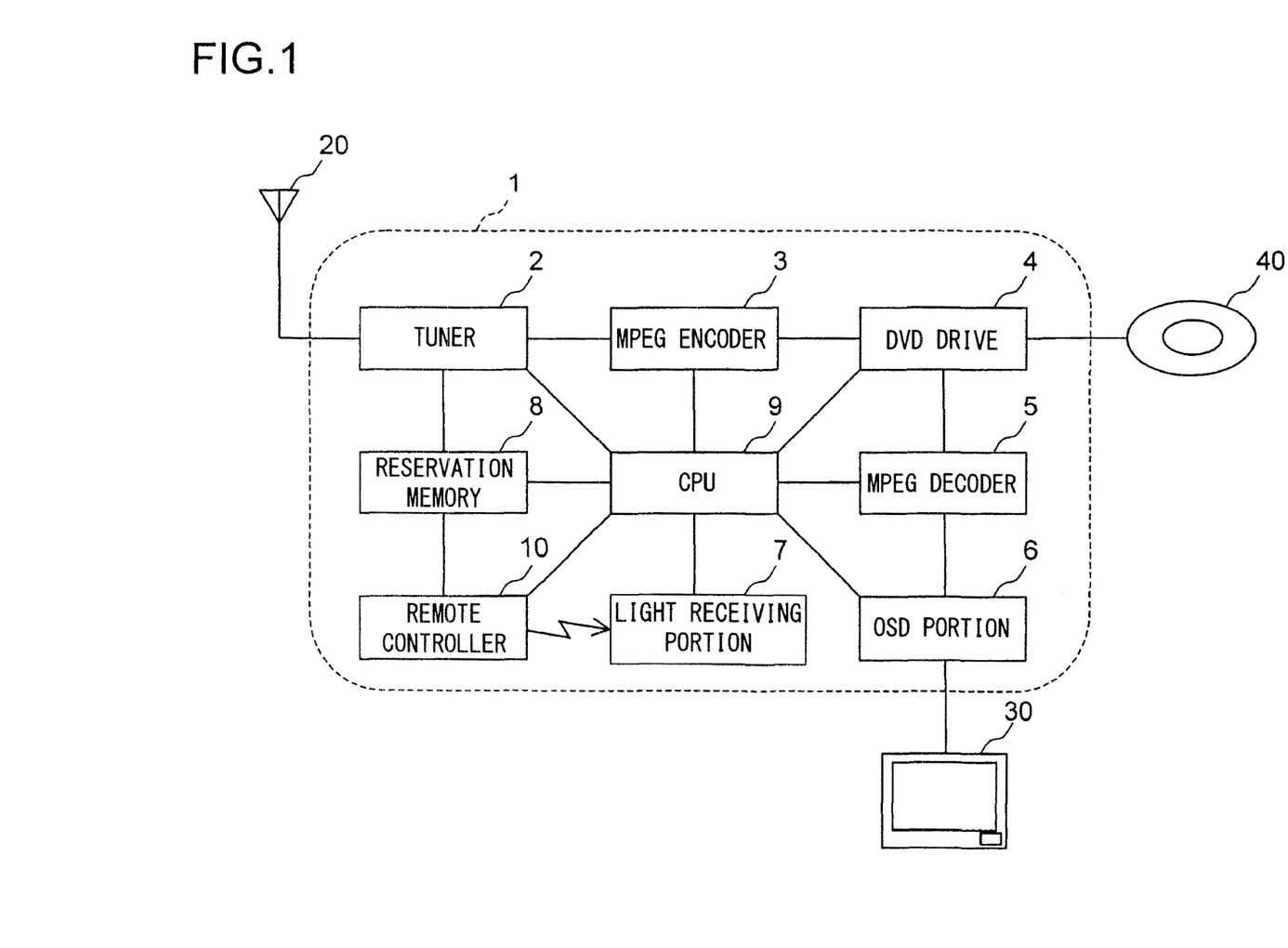
FIG. 1 is a block diagram to show a structure of a DVD recorder according to an embodiment of the present invention.

In the following description, a DVD recorder will be exemplified. FIG. 1 is a block diagram to show a structure of a DVD recorder 1 (an information recording apparatus) according to an embodiment of the present invention. At this point, FIG. 1 shows only a structure that is necessary for the present invention, and other structures that are unnecessary to describe are omitted. The DVD recorder 1 is equipped with a tuner 2, an MPEG encoder 3, a DVD drive 4, an MPEG decoder 5, an on screen display (OSD) portion 6, a light receiving portion 7, a reservation memory 8, a CPU 9 (a timer reservation setting portion) and a remote controller 10 (a reservation time input portion and an upper limit input portion).

At this point, the remote controller 10 is portable independently of a main body of the DVD recorder. Furthermore, the tuner 2 is connected to an antenna 20, and the OSD portion 6 is connected to a television set 30. In addition, the DVD drive 4 is loaded with a DVD 40 (recording medium) that is a recording medium on which recording and reproducing are performed.

Using the DVD recorder 1 according to the present embodiment, broadcasting information is recorded on the DVD 40 by a flow of processes as described below. First, a broadcasting signal of a desired channel is selected by the tuner 2 from broadcasting signals received by the antenna 20. Next, the MPEG encoder 3 performs encoding, and the DVD drive 4 performs recording on the DVD 40.

Furthermore, using the DVD recorder 1 according to the present embodiment, information recorded on the DVD 40 is reproduced by the flow of processes as described below. First, the DVD drive 4 read out a digital record signal recorded on the DVD 40, and this digital record signal is sent to the MPEG decoder 5. Next, the MPEG decoder 5 performs decoding of the digital record signal, and an output signal thereof is sent to the television set 30 via the OSD portion 6. Then, the television set 30 produces pictures and sounds.

The light receiving portion 7 receives an infrared signal from the remote controller 10 corresponding to various instructions made by operation of a plurality of input keys provided to the remote controller 10, and it converts the infrared signal into an electric signal that is sent to the CPU 9.

The reservation memory 8 is a memory that stores information concerning the recording reservation that is set at that time point.

The CPU 9 is connected to the tuner 2, the MPEG encoder 3, the DVD drive 4, the MPEG decoder 5, the OSD portion 6, the light receiving portion 7 and the reservation memory 8, and it supplies control instruction signals to them so that they perform various operations.

Next, an operation of the DVD recorder 1 of the present embodiment as it performs recording with the recording reservation will be described. The CPU 9 monitors the information concerning the recording reservation stored in the reservation memory 8 and makes the tuner 2 select the broadcasting signal of a channel to be recorded when the record start time comes. Then, the broadcasting signal is encoded by the MPEG encoder 3, and the obtained record signal is recorded on the DVD 40 by the DVD drive 4. Then, the CPU 9 stops these operations when the record end time comes.

In other words, the DVD drive 4, the reservation memory 8 and the CPU 9 constitute a timer recording portion that records information on the DVD 40 at the time reserved by the timer reservation device that will be described later.

Next, an operation of setting the recording reservation by using the DVD recorder 1 of the present embodiment will be described. When a recording reservation button (not shown) that is provided to the remote controller 10 is pressed, an infrared signal that corresponds to the recording reservation button is sent from the remote controller 10 to the light receiving portion 7. When the light receiving portion 7 receives the infrared signal, it converts the infrared signal into an electric signal, which is sent to the CPU 9.

Figure 2:
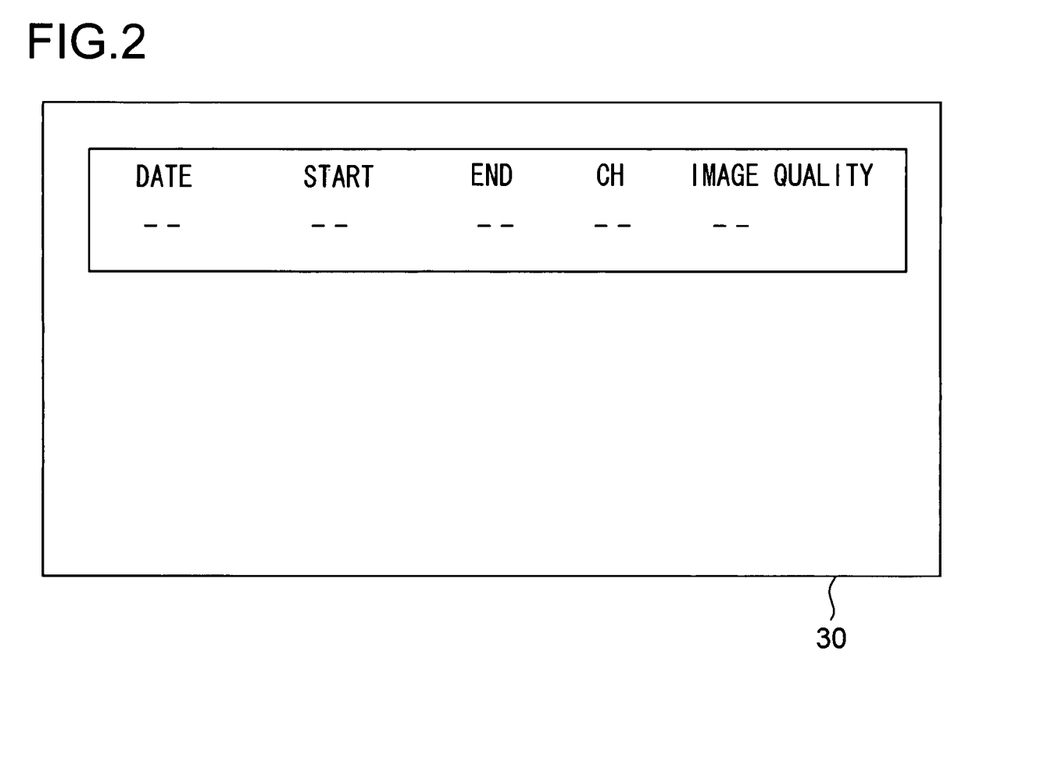
FIG. 2 is an explanatory diagram to show a screen that is displayed first on a television set when a recording reservation button provided to a remote controller is pressed for operation.

Then, the CPU 9 instructs the OSD portion 6 to display a setting screen for the recording reservation. Then, the OSD portion 6 generates an OSD signal concerning the setting screen for the recording reservation and makes the television set 30 display the setting screen for the recording reservation. At this time point, the television set 30 displays the setting screen for the recording reservation as shown in FIG. 2.

Then, a user operates the remote controller 10 so as to enter record start date, record start time, record end time, channel information and image quality by recording speed for recording (hereinafter referred to as only "image quality") on the screen so that the recording reservation is performed. When these inputs are performed, the OSD signal that was generated before is updated sequentially. As a result, the display screen of the television set 30 is updated sequentially. In addition, when the timer reservation is completed, the CPU 9 issues an instruction so that the information of the recording reservation concerning the record start date, the record start time, the record end time, the channel information and the image quality is stored in the reservation memory 8.

In other words, the light receiving portion 7, the reservation memory 8, the CPU 9 and the remote controller 10 constitute the timer reservation device that performs the timer reservation.

Figure 3:
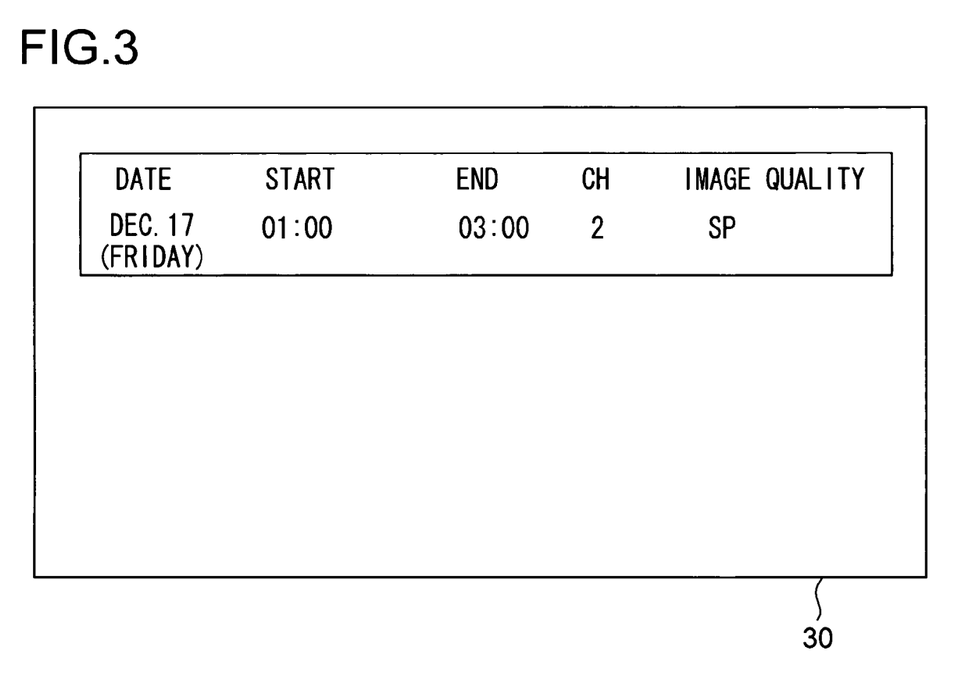
FIG. 3 is an explanatory diagram to show an example of a setting screen for the recording reservation in which record start date, record start time, record end time, channel information and image quality are entered.

FIG. 3 is an explanatory diagram to show an example of the setting screen for the recording reservation in which record start date, record start time, record end time, channel information and image quality are entered. In FIG. 3, "Dec. 17 (Friday)" is entered as the record start date, "01:00" is entered as the record start time, "03:00" is entered as the record end time, "2 CH" is entered as the channel information, and "SP mode" is entered as the image quality. In other word, FIG. 3 shows an example of the case where the recording reservation is set for recording from one o'clock to three o'clock after midnight on Dec. 17 (Friday).

Figure 4:
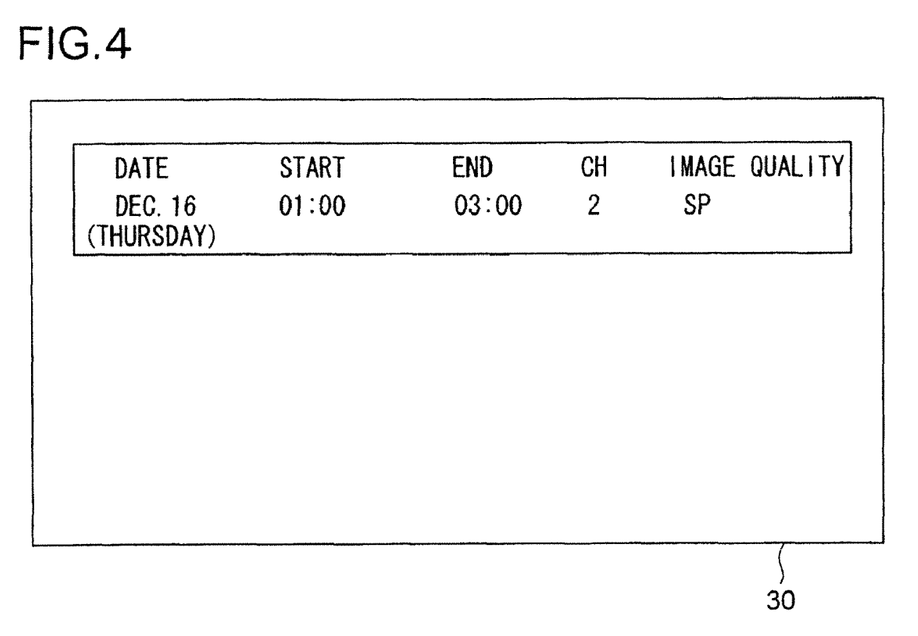
FIG. 4 is an explanatory diagram to show an example of the setting screen for the recording reservation in which the record start date is entered by mistake.

At this point, a user may often set the date to "Dec. 16 (Thursday)" by mistake as shown in FIG. 4 although the user intends to set the recording reservation for recording from one o'clock to three o'clock after midnight on Dec. 17 (Friday) as shown in FIG. 3. This is caused by factors such as the fact that the TV programs from one o'clock to three o'clock after midnight on Dec. 17 (Friday) are usually listed in a TV program table of Dec. 16 (Thursday) among TV program tables on newspapers, TV information magazines, the Internet and the like.

Figure 5:
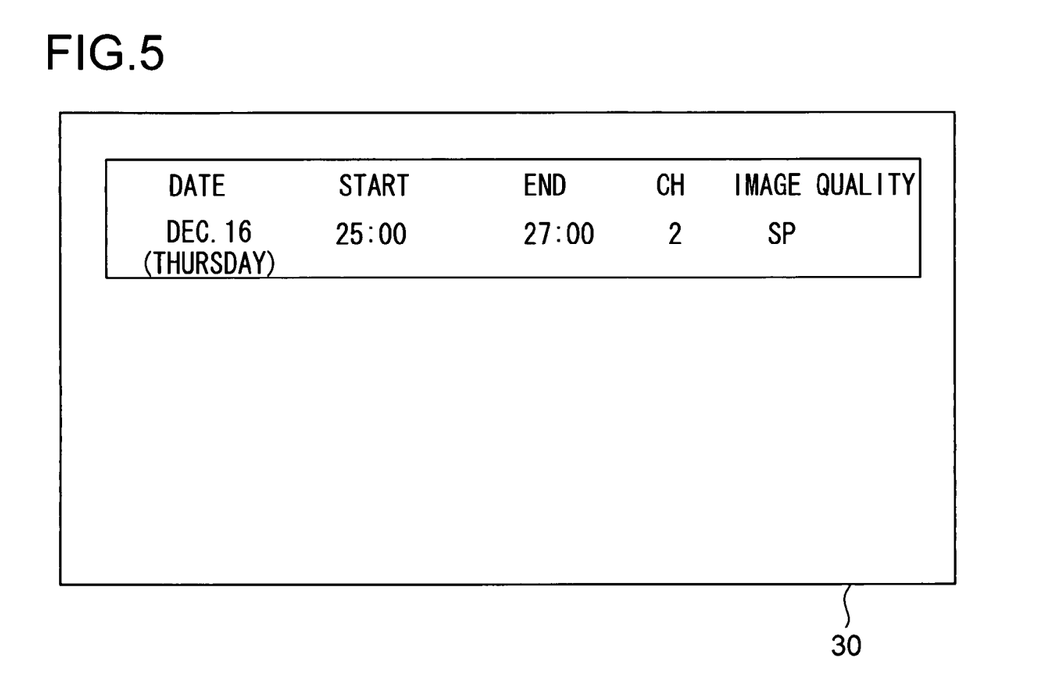
FIG. 5 is an explanatory diagram to show an example of the setting screen for the recording reservation in which a number greater than 24 is entered as hours of the record start time and the record end time.

Therefore, the DVD recorder 1 according to the present embodiment permits input of a number greater than 24 as hours of the record start time and the record end time. More specifically, in the DVD recorder 1 according to the present embodiment, the recording reservation for recording from one o'clock to three o'clock after midnight on Dec. 17 (Friday) can be set also by entering "Dec. 16 (Thursday)" as the record start date, "25:00" as the record start time and "27:00" as the record end time in the setting screen for the recording reservation as shown in FIG. 5.

According to this structure, it is possible to prevent a mistake of entering wrong date, which is apt to occur in setting recording reservation for a program after midnight. At this point, an upper limit of a number that can be entered as hours of the record start time and the record end time may be set by a user with the remote controller 10, or it may be a predetermined value.

Furthermore, in a usual DVD recorder, the record start time and the record end time can be set by entering a number directly by using numeric keys that are provided to the remote controller 10 or by increasing or decreasing the number by a predetermined difference using an up down key that is provided to the remote controller 10 (the up down key may be a "+/−" key or other key that is different depending on a model of the device).

Figure 6A:
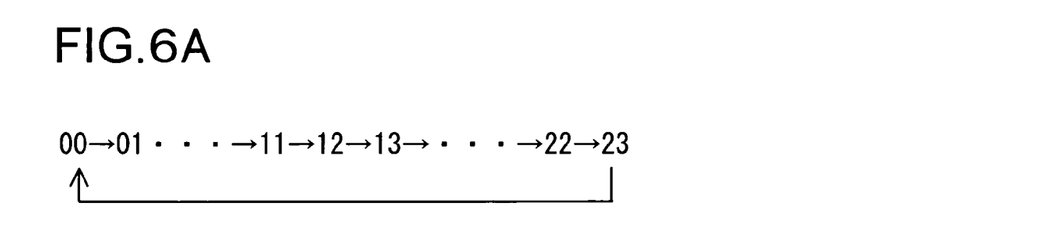
FIG. 6A is an explanatory diagram to show a feeding order of numbers when hours of the record start time and the record end time are entered by using an up down key in a usual DVD recorder.

When hours of the record start time and the record end time are set by using the up down key that is provided to the remote controller 10, a feeding order of the number in a usual DVD recorder is like the example shown in FIG. 6A. In contrast, the feeding order of the number in the DVD recorder 1 according to the present embodiment is like the example shown in FIG. 6B. At this point, this example is the case where a number up to 27 can be entered as hours of the record start time and the record end time.

Figure 6B:
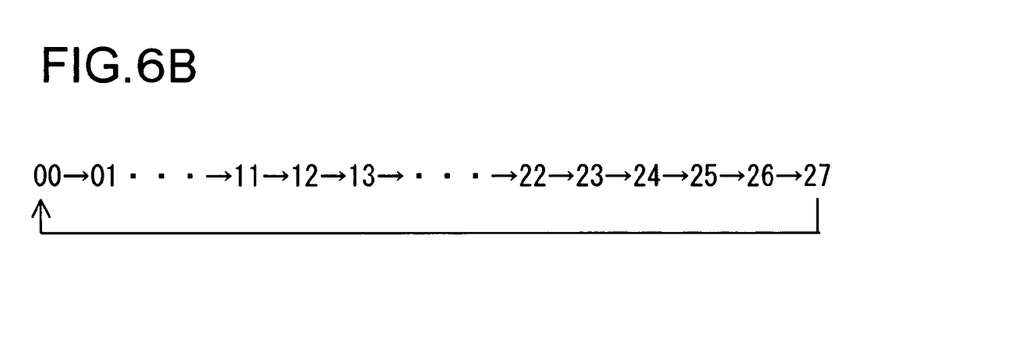
FIG. 6B is an explanatory diagram to show a feeding order of numbers when hours of the record start time and the record end time are entered by using an up down key in the DVD recorder according to the present embodiment.

At this point, it is considered to be reasonable that the upper limit of a number that can be entered as hours of the record start time and the record end time is approximately 27 to 30. It is because that a program list of a certain day usually includes programs till approximately three o'clock to six o'clock after midnight the next day on newspapers, TV information magazines, the Internet and the like. However, it is possible to have a structure in which a number greater than 30 can be entered.

Although the embodiment described above has a structure in which a.m. or p.m. is not entered when the record start time and the record end time are entered for the recording reservation, it is possible to have a structure in which a.m. or p.m. is entered. In this case, for both of or one of a.m. and p.m., a number greater than 12 can be entered as hours.

Figure 7:
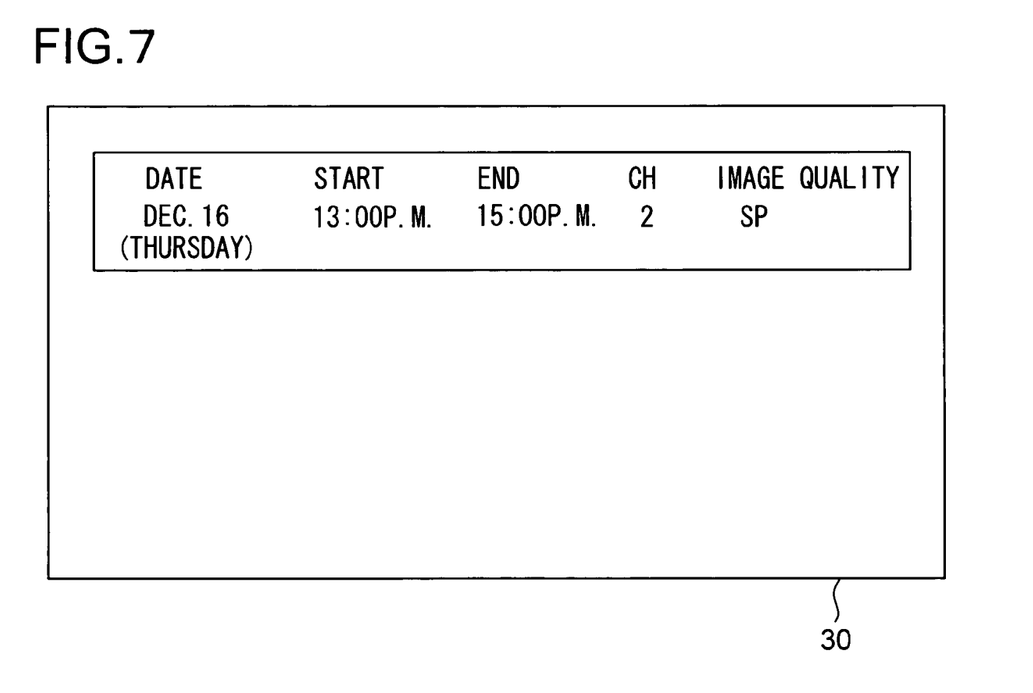
FIG. 7 is an explanatory diagram to show an example of the setting screen for the recording reservation with input of a.m. or p.m. information, in which a number greater than 12 is entered as hours of the record start time and the record end time.

More specifically, in this case, "the recording reservation for recording from one o'clock to three o'clock after midnight on Dec. 17 (Friday) can be set also by entering "Dec. 16 (Thursday)" as the record start date, "13:00 p.m." as the record start time and "15:00 p.m." as the record end time in the setting screen for the recording reservation as shown in FIG. 7.

According to this structure, it is possible to prevent a mistake of entering wrong date, which is apt to occur in setting recording reservation for a program after midnight even if a.m. or p.m. is entered in setting the record start time and the record end time for the recording reservation. At this point, the upper limit of a number that can be entered as hours of the record start time and the record end time may be set by a user with the remote controller 10, or it may be a predetermined value.

At this point, it is considered to be reasonable that the upper limit of a number that can be entered as hours of the record start time and the record end time with input of a.m. or p.m. is approximately 15 to 18. It is because that a program list of a certain day usually includes programs till approximately three o'clock to six o'clock after midnight the next day on newspapers, TV information magazines, the Internet and the like. However, it is possible to have a structure in which a number greater than 18 can be entered.

It should be understood that the present invention is not limited to the embodiment described above, which can be modified variously within the spirit and the scope of the present invention. For example, although recording reservation of a DVD recorder is exemplified in the embodiment described above, the present invention can be applied to recording reservation of a hard disk recorder or a video cassette recorder as well. In addition, the present invention can be applied also to timer reservation of electric household appliances other than the recording reservation, such as timer reservation of an air conditioner (for a function of starting or stopping the air conditioner at a set time) or the like.

The present invention is effective for a timer reservation device and an information recording apparatus.

What is claimed is:

1. A timer reservation device comprising:
   a reservation date input option for entering reservation date;
   a reservation time input portion for entering reservation time; and
   a timer reservation setting portion for setting timer reservation to the reservation time that is entered by the reservation time input portion, wherein
   an upper limit x of a number that is entered as hours of the reservation time is an integer equal to or greater than 24,
   the reservation time comprises a reservation start time and a reservation end time, the timer reservation setting portion,
      when a number indicating hours in the reservation start time is equal to or greater than 24, sets a start time of the timer reservation at a time belonging to a next day after the reservation date and having hours equal to 24 subtracted from the number indicating hours in the reservation start time, and
      when a number indicating hours in the reservation end time is equal to or greater than 24, sets an end time of the timer reservation at a time belonging to a next day after the reservation date and having hours equal to 24 subtracted from the number indicating hours in the reservation end time.

2. A timer reservation device comprising:
   a reservation date input portion for entering reservation date;
   a reservation time input portion for entering reservation time that includes information of a.m. or p.m.; and
   a timer reservation setting portion for setting timer reservation to the reservation time that is entered by the reservation time input portion, wherein
   an upper limit x of a number that is entered as hours of the reservation time is an integer equal to or greater than 12,
   the reservation time comprises a reservation start time and a reservation end time,
   the timer reservation setting portion,
      when the reservation start time includes information of p.m. and a number indicating hours in the reservation start time is equal to or greater than 12, sets a start time of the timer reservation at a time belonging to a next day after the reservation date and having hours equal to 12 subtracted from the number indicating hours in the reservation start time, with the information of p.m. included in the reservation start time changed to information of a.m., and
      when the reservation end time includes information of p.m. and a number indicating hours in the reservation end time is equal to or greater than 12, sets an end time of the timer reservation at a time belonging to a next day after the reservation date and having hours equal to 12 subtracted from the number indicating hours in the reservation end time, with the information of p.m. included in the reservation end time changed to information of a.m.

3. The timer reservation device according to claim 1, further comprising an upper limit input portion for entering the upper limit x.

4. The timer reservation device according to claim 2, further comprising an upper limit input portion for entering the upper limit x.

5. An information recording apparatus comprising:
   the timer reservation device according to claim 1; and
   a timer recording portion for recording information on a recording medium at a time reserved by the timer reservation device.

6. The information recording apparatus according to claim 5, further comprising an upper limit input portion for entering the upper limit x.

* * * * *